United States Patent
Jaouen

(10) Patent No.: US 12,242,393 B2
(45) Date of Patent: Mar. 4, 2025

(54) PROTECTION SYSTEM AND METHOD FOR A MEMORY

(71) Applicant: STMicroelectronics (Grand Ouest) SAS, Le Mans (FR)

(72) Inventor: Michel Jaouen, Yvre l'eveque (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 85 days.

(21) Appl. No.: 17/010,072

(22) Filed: Sep. 2, 2020

(65) Prior Publication Data

US 2021/0081333 A1 Mar. 18, 2021

(30) Foreign Application Priority Data

Sep. 12, 2019 (FR) ...................................... 1910065

(51) Int. Cl.
| | |
|---|---|
| *G06F 12/00* | (2006.01) |
| *G06F 12/14* | (2006.01) |
| *G06F 13/00* | (2006.01) |
| *G06F 21/62* | (2013.01) |
| *G06F 21/78* | (2013.01) |

(52) U.S. Cl.
CPC ...... *G06F 12/1458* (2013.01); *G06F 21/6218* (2013.01); *G06F 21/78* (2013.01); *G06F 2212/1052* (2013.01)

(58) Field of Classification Search
CPC ............. G06F 12/1458; G06F 21/6218; G06F 2212/1052
USPC ....................................................... 711/163
See application file for complete search history.

(56) References Cited

U.S. PATENT DOCUMENTS

| | | | | | |
|---|---|---|---|---|---|
| 5,845,331 | A | * | 12/1998 | Carter ................... | G06F 12/145 711/163 |
| 6,154,818 | A | * | 11/2000 | Christie .............. | G06F 12/1491 711/170 |
| 6,286,104 | B1 | * | 9/2001 | Buhle ................... | H04L 63/105 707/999.009 |
| 6,516,395 | B1 | * | 2/2003 | Christie .............. | G06F 12/1491 711/170 |
| 6,789,199 | B1 | * | 9/2004 | Wilhelm, Jr. ......... | G06F 21/123 705/52 |
| 6,854,039 | B1 | * | 2/2005 | Strongin ............. | G06F 12/1491 713/161 |
| 7,426,644 | B1 | * | 9/2008 | Strongin ............. | G06F 12/1441 713/193 |
| 7,996,663 | B2 | * | 8/2011 | Stillwell, Jr. ........... | G06F 9/462 712/228 |

(Continued)

FOREIGN PATENT DOCUMENTS

| | | |
|---|---|---|
| CN | 109923546 A | 6/2019 |
| WO | 2014122415 A1 | 8/2014 |

OTHER PUBLICATIONS

ARM Limited, "Programmer's Guide ARMv7 Cortex-R Series Programmer's Guide,", XP055599414, vol. 1 Janvier 2014, pp. 1-232.

(Continued)

*Primary Examiner* — Sheng Jen Tsai
(74) *Attorney, Agent, or Firm* — Slater Matsil, LLP

(57) ABSTRACT

An embodiment system for protecting a memory comprises security software configured to determine, from an exception generated during an unauthorized action attempt in the memory, whether the security software can perform the action.

19 Claims, 2 Drawing Sheets

(56) References Cited

U.S. PATENT DOCUMENTS

| | | | | |
|---|---|---|---|---|
| 8,635,204 | B1* | 1/2014 | Xie | G06F 8/71 |
| | | | | 707/E17.075 |
| 8,726,101 | B2* | 5/2014 | Ahn | G06F 11/3636 |
| | | | | 714/48 |
| 8,813,079 | B1* | 8/2014 | Lindo | G06F 9/526 |
| | | | | 718/100 |
| 9,286,105 | B1* | 3/2016 | Levchenko | G06F 9/45558 |
| 9,503,452 | B1* | 11/2016 | Kumar | H04L 63/0838 |
| 10,102,380 | B2* | 10/2018 | McKeen | G06F 21/72 |
| 10,338,847 | B1* | 7/2019 | Mastropaolo | G06F 9/455 |
| 10,635,479 | B2 | 4/2020 | Lutas | |
| 10,698,668 | B1* | 6/2020 | Pohlack | G06F 8/71 |
| 11,720,356 | B2* | 8/2023 | Grocutt | G06F 12/1441 |
| | | | | 712/208 |
| 2003/0188173 | A1* | 10/2003 | Zimmer | G06F 21/57 |
| | | | | 713/189 |
| 2004/0093605 | A1* | 5/2004 | Alverson | G06F 9/52 |
| | | | | 719/310 |
| 2004/0103221 | A1* | 5/2004 | Rosu | G06F 9/545 |
| | | | | 710/1 |
| 2005/0149726 | A1* | 7/2005 | Joshi | G06F 21/51 |
| | | | | 726/4 |
| 2006/0010205 | A1* | 1/2006 | Beartusk | G06Q 10/10 |
| | | | | 709/205 |
| 2007/0011419 | A1* | 1/2007 | Conti | G06F 12/1458 |
| | | | | 711/163 |
| 2007/0074169 | A1* | 3/2007 | Chess | G06F 21/54 |
| | | | | 717/124 |
| 2007/0283361 | A1 | 12/2007 | Blanchet et al. | |
| 2009/0007256 | A1* | 1/2009 | Raymond | G06F 21/41 |
| | | | | 726/19 |
| 2009/0228673 | A1* | 9/2009 | Waters | G06F 12/1491 |
| | | | | 711/163 |
| 2011/0251952 | A1* | 10/2011 | Kelly | G06Q 20/102 |
| | | | | 705/40 |
| 2012/0030408 | A1* | 2/2012 | Flynn | G06F 11/1471 |
| | | | | 711/E12.001 |
| 2012/0124429 | A1* | 5/2012 | Ahn | G06F 12/1441 |
| | | | | 714/45 |
| 2013/0042295 | A1* | 2/2013 | Kelly | H04W 12/082 |
| | | | | 726/1 |
| 2013/0159663 | A1* | 6/2013 | Levenglick | G06F 12/1009 |
| | | | | 711/206 |
| 2013/0232344 | A1* | 9/2013 | Johnson | G06F 21/53 |
| | | | | 713/193 |
| 2014/0195730 | A1* | 7/2014 | Feekes | G11C 11/4078 |
| | | | | 711/128 |
| 2016/0065672 | A1* | 3/2016 | Savage | H04L 67/1095 |
| | | | | 709/219 |
| 2016/0371496 | A1 | 12/2016 | Sell | |
| 2016/0381135 | A1* | 12/2016 | McGregor | H04L 67/63 |
| | | | | 709/229 |
| 2017/0063532 | A1* | 3/2017 | Bhattacharyya | G06F 21/76 |
| 2017/0153983 | A1* | 6/2017 | Sherlock | G06F 12/145 |
| 2017/0168963 | A1* | 6/2017 | Jaeger | G06F 21/00 |
| 2017/0206126 | A1* | 7/2017 | Sherlock | G06F 11/0757 |
| 2018/0004946 | A1* | 1/2018 | LeMay | G06F 21/53 |
| 2018/0173555 | A1 | 6/2018 | Lutas | |
| 2018/0211017 | A1* | 7/2018 | Homescu | G06F 21/14 |
| 2018/0239607 | A1* | 8/2018 | Parker | G06F 9/30098 |
| 2019/0163910 | A1* | 5/2019 | Moon | G06F 21/54 |

OTHER PUBLICATIONS

Pinto, S., et al., "Vritualization on TrustZone-Enabled Microcontrollers," 2019 IEEE Real-Time and Embedded Technology and Applications Symposium (RTAS), IEEE, XP033567172, Apr. 16, 2019, pp. 293-304.

Xiao et al., "Design of Memory Management Unit in SPARC V8 Processor," Science Technology and Engineering, vol. 10, No. 31, Nov. 2010, 6 pages.

* cited by examiner

PROTECTION SYSTEM AND METHOD FOR A MEMORY

CROSS-REFERENCE TO RELATED APPLICATIONS

This application claims the benefit of French Application No. 1910065, filed on Sep. 12, 2019, which application is hereby incorporated herein by reference.

TECHNICAL FIELD

The present disclosure relates generally to memory protection systems and methods.

BACKGROUND

Security is a major issue for businesses in the computer or electronics fields as well as for all surrounding players. In particular, the security of the memories of electronic devices, and therefore information, is especially important.

In computers, the protection of memory is generally done by a set of systems implemented at the hardware and software levels in order for one process not to be able to access the memory used by another process or not to be able to access protected information.

SUMMARY

One embodiment addresses all or some of the drawbacks of the known memory protection systems.

One embodiment provides a system for protecting a memory comprising security software configured to determine, from an exception generated during an unauthorized action attempt in the memory, whether the security software can perform the action.

According to one embodiment, the action attempt is performed by other software.

According to one embodiment, the security software is configured to obtain characteristics of the action from the generated exception.

According to one embodiment, at least some of the obtained characteristics are comprised among: the address of the memory targeted by the action attempt, the identification of the software trying to act in the memory, the action that the other software is trying to perform, the operator code of the action, registers of the action.

According to one embodiment, the security software is configured to compare the obtained characteristics of the action to information representative of the actions that can be performed in a memory.

According to one embodiment, the programmed information is only accessible to the security software.

According to one embodiment, the system comprises a protection unit of the memory configured to define regions in the memory and to assign protection levels to the regions.

According to one embodiment, the exception is generated by the protection unit of the memory.

Another embodiment provides a method for using a protection system of a memory, comprising the following steps: generating an exception during an unauthorized action attempt in the memory; and determining, using security software, from the exception, whether the security software is authorized to perform the action.

According to one embodiment, the method comprises a step for decrypting the exception, so as to obtain characteristics of the action.

According to one embodiment, the method comprises a step during which the security software performs the action.

According to one embodiment, the other software next continues its execution.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the device comprising the memory protection system will not be described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
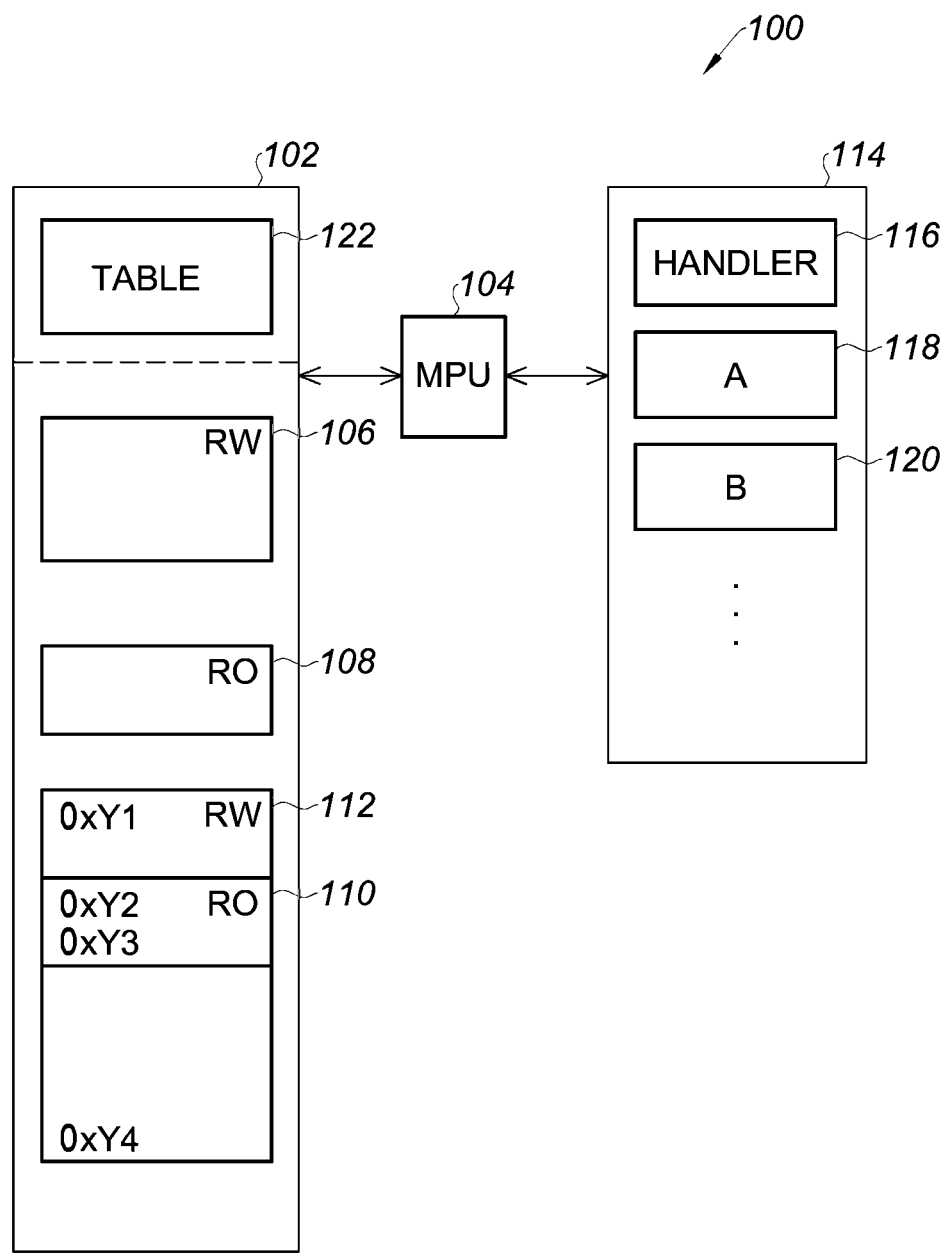
FIG. 1 illustrates an embodiment of a memory protection system.

FIG. 1 illustrates an embodiment of a memory protection system 100.

The system is for example part of an electronic device such as a computer, a telephone or any other electronic device for example comprising a microcontroller and at least one memory.

FIG. 1 comprises a block 102 representing the memory. The block 102 can represent a single memory or several memories. The memory 102 can be one or several volatile or nonvolatile memories, or several memories, certain memories being volatile and other memories being non-volatile. For example, the memory 102 comprises memory of the ROM type, memory of the Flash type, memory of the RAM type and optionally other types of memory.

The system comprises a memory protection unit 104 (MPU). The memory protection unit is for example part of a memory management unit (MMU). The memory protection unit can also optionally replace the memory management unit. The protection unit 104, and optionally the memory management unit are generally part of a central processing unit (CPU).

The protection unit 104 is for example a hardware component. The protection unit 104 is therefore for example not software. Software refers to a set of sequences of instructions able to be interpreted by a device for example comprising a microcontroller and a set of data necessary for these operations. The software therefore determines the actions that can be done by the device.

The protection unit 104 makes it possible to authorize so-called privileged access software, or privileged software, to access regions in the memory having been defined by the protection unit. The protection unit 104 also assigns authorization levels, or protection levels, to the different regions, that is to say, determines the actions that can be performed in these regions of the memory, and what software can perform these actions.

Each region is defined by a start address and an end address, or by a start address and a size.

The software can for example have two types of authorization levels, that is to say, privileged access (or privileged software), or nonprivileged access (or nonprivileged software). Each region defined by the protection unit 104 allows certain actions for software of the privileged type and certain actions for software of the nonprivileged type.

For example, certain regions, such as the region 106 (RW—Read Write), authorize software of the privileged type and software of the nonprivileged type to read and write in this region of the memory.

For example, certain regions, such as the region 108 (RO—Read Only), authorize the software of the privileged type to read and write in this region of the memory and authorize the software of the nonprivileged type to read in this region of the memory, but not to write. Thus, the access by software of the nonprivileged type to the region 108 of the memory is restricted.

Optionally, the software can be divided into a larger number of authorization levels. The software of each authorization level can perform certain actions on certain regions of the memory, and optionally cannot perform other actions on certain regions of the memory. For example, the software can be privileged, that is to say, having access to the entire memory, or can be nonprivileged in other ways, that is to say, having different restrictions, different authorizations and different accesses.

The number of regions of the memory able to be defined by the protection unit 104 is limited. For example, some protection units can define 8 or 16 regions of the memory.

So as to optimize the protection and the division of the regions of the memory, some regions defined by the protection unit 104 can be superimposed.

A region 110 (RO—Read Only) can be located in a region 112 (RW—Read Write). The region 112 for example extends from an address 0xY1 to an address 0xY4. The region 110 for example extends from an address 0xY2 to an address 0xY3. The address 0xY4 is located after the address 0xY3. The address 0xY3 is located after the address 0xY2. The address 0xY2 is located after the address 0xY1.

Thus, although the addresses of the region 110, comprised between 0xY2 and 0xY3, are also located in the region 112, between 0xY1 and 0xY4, the region 110 has a different authorization level from the other parts of the region 112.

It is not, however, possible to define enough regions in the memory for the entire memory to have an adequate authorization level for its use.

In order to ensure the security of the memory and limit the number of regions, one generally chooses to define broad regions, in the memory, having a high authorization level. A high authorization level for example refers to a level allowing only software of the privileged type to write and optionally read. It is thus possible to protect a large part of the memory while using a limited number of regions. However, the parts of the memory to which one wishes to assign a high authorization level are not all located successively in the memory. It is therefore possible for the parts of the memory to which one wishes to assign a lower, or weaker, protection level, for example regions in which one wishes to authorize reading and writing to all of the software, to be located in a region having a higher authorization level.

For example, information regarding a clock can for example be located in the region 108. Software of the nonprivileged type can seek to use, read or write this information, but will not have access thereto.

Indeed, the protection unit 104 supervises the actions and the instructions of the software trying to have access to the memory. The protection unit 104 determines, depending on the type of software and depending on the authorization level of the targeted region, whether the software can perform the action in the memory.

If the unit 104 determines that the software is authorized to act in the memory, the software can perform the action, for example reading or writing in the memory. The action is performed by the software requesting the action, that is to say, the software sending the instruction.

If the unit 104 determines that the software is not authorized to act in the memory, the software does not perform the action. Additionally, an exception is generated by the protection unit 104.

This exception indicates an unauthorized access attempt, that is to say, that software has sought to perform an action for which the software does not have authorization.

FIG. 1 comprises a block 114 for example showing another part of the memory. The block 114 can also show several memories. Like in the case of the block 102, the block 114 can show a single memory or several memories. The block 114 can be one or several volatile or nonvolatile memories, or several memories, certain memories being volatile and other memories being non-volatile. For example, the block 114 comprises memory of the ROM type, memory of the Flash type, memory of the RAM type and optionally other types of memory.

The block 114 comprises software of the system 100. The block 114 in particular comprises security software HANDLER, shown by a block 116. The block 114 also comprises two software applications A and B, shown respectively by blocks 118 and 120. The block 114 comprises other software applications, not shown.

The software application A is for example software of the privileged type. The software application A for example has access, to read and write, to all of the parts of the memory. The software application A for example has the right to write and read in the regions 106 RW and in the regions 108 RO.

The software application B is for example a software application of the nonprivileged type. The software application B is therefore restricted in the actions that it can accomplish in the memory. Thus, the software application B cannot write in the regions 108 RO. The software application B can, however, read and write in the regions 106 RW.

In the embodiment of FIG. 1, the system also comprises the software HANDLER. The software HANDLER is for example at least partially located in the same memory as the software A and/or the software B.

The software HANDLER is configured to receive the exceptions emitted when an unauthorized access attempt to the memory 102 is made. The exception is for example emitted by the protection unit 104. The exception may optionally be received by one or several other elements in the device.

The software HANDLER is configured to be able to decrypt the exception emitted during the unauthorized access attempt. More specifically, the software HANDLER is configured to be able to obtain, from the exception, characteristics of the access attempt.

The software is thus configured to determine at least certain elements among: the address of the memory targeted by the access attempt, the identification of the software (for example, the software A or B) attempting to access the memory 102, the action that the software is seeking to perform, the operator code of the action, variables of the action, and optionally other information.

In one example, the software B seeks to perform an action "STR R1 [R8]" in the registers associated with a peripheral. It is assumed that the part of the memory 102 containing the registers is in a region RO, for example the region 108, not accessible by the software B. The software HANDLER can then for example determine, from the generated exception:
the part of the targeted memory;
the identification of the software B;
the action that the software B is seeking to perform;
whether it involves a write operation;
whether the writing is done in, or targets, the location of the memory where the address is contained in a register R8; and
the value to be written is the value contained in the register R1.

The software HANDLER is configured to compare this information with a table 122 (TABLE) so as to determine whether this action is authorized.

The table TABLE is contained in a memory of the device. The table comprises information representative of the actions that can be performed.

The table 122 for example comprises the characteristics of the actions that can be performed in the memory 102. More specifically, the table 122 for example comprises the characteristics of the actions, not authorized in the regions by the protection unit 104, nevertheless able to be performed by means of the software HANDLER.

The characteristics of the table more specifically relate to more or less precise actions. For example, the table can comprise characteristics making it possible to determine whether it is possible, for the nonprivileged software, to read and write in a region included in a region such as the region 108. The table can also make it possible to determine that these actions are only possible for specific nonprivileged software and not all of the nonprivileged software. The table can also comprise all of the characteristics of an action. For example, the action "STR R0 [R8]" previously described may be authorized, but the operation "STR R0 [R9]" may not be. All of the characteristics of the action "STR R0 [R8]" are then comprised in the table 122 so as to be able to determine whether this action is authorized.

The table is preferably only accessible to the software HANDLER. This is for example established by hardware. The table is for example contained in a memory only containing the table. The memory containing the table is for example a separate memory from the other memories used in the operation of the device. The memory containing the table is for example only physically accessible by the software HANDLER.

The software HANDLER is also configured to be able to access the memory 102, preferably the entire memory, and in particular to be able to access the rules not accessible to the nonprivileged software. The software HANDLER can therefore access the regions of the memory 102 in which the unauthorized accesses have been attempted.

The software HANDLER is configured to be able to perform the unauthorized action having triggered an exception, if the software HANDLER determines that this action is authorized in agreement with the table TABLE.

If an action is not authorized by the protection unit 104 but is authorized by the information contained in the table TABLE, the action is performed by the software HANDLER and not by the original software whose access attempt to the memory triggered the exception, for example the software B. The original software therefore does not act in the regions to which it does not have access, although the action can be performed. The action is therefore accomplished by software (the software HANDLER) having an authorization level making it possible to access the region of the memory in question.

The content of the table is for example programmed during the manufacturing of the device. The content of the table is for example programmed during the establishment of the authorization and protection levels of the different regions of the memories. The content of the table is for example written by the software HANDLER.

As a variant, the device can comprise several software applications HANDLER. Each software application HANDLER is for example associated with a memory. The software applications HANDLER are for example each associated with a table 122. Some software applications HANDLER are for example associated with a same table 122.

Figure 2:
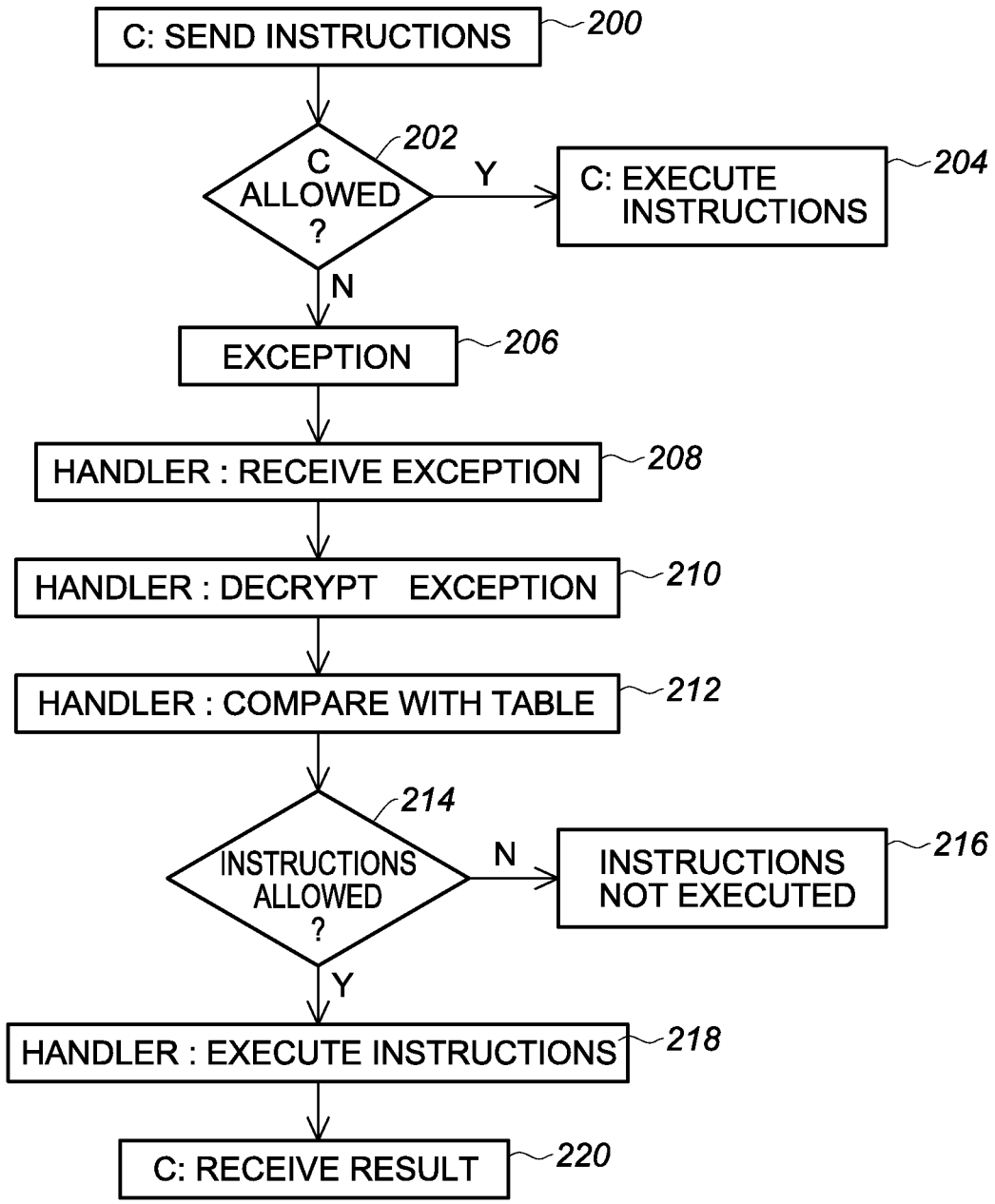
FIG. 2 shows an exemplary usage method of the protection system embodiment of the memory of FIG. 1.

FIG. 2 shows an exemplary usage method of the protection system embodiment of the memory of FIG. 1.

During a first step 200 (C: SEND INSTRUCTIONS), a software application C tries to access a region of a memory to perform an action there.

The software C is for example a software application contained in the same memory as the software HANDLER and/or the software A and/or the software B.

The software C therefore sends instructions, that is to say, code making it possible to implement the action that the software C wishes to perform in the memory. For example, the software C seeks to perform the action "STR R0 [R8]" in the registers associated with a peripheral.

When the software C tries to reach the memory 102, the protection unit 104 of the memory determines whether this action is allowed. This is step 202 (C ALLOWED?). The protection unit of the memory therefore determines whether the software C has a sufficient authorization level to perform this action in this region of the memory.

If the software C has a sufficient authorization level (branch Y), the software C performs the action. This is step 204 (C: EXECUTE INSTRUCTIONS). For example, the software C is privileged software and has access to all of the regions of the memory. For example, the action that the software C wishes to perform is authorized in this region of the memory even for the nonprivileged software. For example, the action to be performed is a read action of a region RO in which the nonprivileged software can read the memory. For example, the action to be performed is a write action of a region RW in which the nonprivileged software can read and write in the memory.

The action is then done by the software C, directly in the memory.

If the software C does not have a sufficient authorization level (branch N), an exception is generated. This is step 206 (EXCEPTION). This exception is for example emitted by the protection unit of the memory.

During a step 208 (HANDLER: RECEIVE EXCEPTION), the software HANDLER receives the exception. During step 210 (HANDLER: DECRYPT EXCEPTION), the software HANDLER decrypts the exception so as to obtain the characteristics of the unauthorized access attempt to the memory. The software HANDLER determines at least certain elements among: the address of the memory targeted by the access attempt, the identification of the software (for example, the software C) attempting to access the memory 102, the action that the software is seeking to perform, the operator code of the action, registers of the action, and optionally other information.

During a step 212 (HANDLER: COMPARE WITH TABLE), the software HANDLER compares the obtained information by decrypting the exception with data contained in the table TABLE 122.

The software HANDLER determines (step 214, INSTRUCTIONS ALLOWED?) whether the action can be performed, that is to say, whether the action was authorized during the programming of the table.

If this action is not authorized (branch N), that is to say, if the information obtained from the exception does not correspond to the information contained in the table TABLE, the action is not performed (step 216, INSTRUCTIONS NOT EXECUTED).

If this action is authorized (branch Y), that is to say, if the information obtained from the exception corresponds to the information contained in the table TABLE, the software HANDLER performs the action (step 218, HANDLER: EXECUTE INSTRUCTIONS). The access to the memory to perform the action, and the modification of the registers corresponding to the action, are therefore done by the software HANDLER. The software C therefore does not have access to the regions of the memory that do not correspond to its authorization level.

During a step 220 (C: RECEIVE RESULT), information resulting from the action performed by the software HANDLER can be supplied to the software C. The software C can for example receive information read from the memory. The software C next continues its execution.

More generally, the software C receives the information allowing it to continue its execution as if it had performed the action itself. The software C thus continues its operation.

The action is therefore performed by means of privileged software, the software HANDLER. The exceptions generated during access attempts by unauthorized software applications make it possible to warn the software HANDLER that software is attempting an action that could be done using it.

One advantage of the described embodiments is that actions coming from nonprivileged software can be performed, including in regions of the memory to which nonprivileged software applications do not have direct access.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A system for protecting a memory, the system comprising:
a hardware memory protection unit, configured to:
assign a first protection level to a first region of the memory, wherein the first protection level is privileged;
assign a second protection level to a second region of the memory, wherein the second protection level is non-privileged;
allow a privileged application access to the first and second regions of the memory, and a non-privileged application access to the second region of the memory; and
generate an exception in response to an attempt by the non-privileged application to perform an unauthorized action in the first region of the memory;
a memory management unit configured to manage the memory;
a table accessible only by security software in the system, wherein the table comprises information representative of actions that can be performed in the first region of the memory by the security software but not by the non-privileged application; and
the security software, being separate software from the applications, and configured to:
determine, in response to the exception, that the security software is authorized to perform the unauthorized action in the first region of the memory, based on at least read versus write characteristics of the unauthorized action being attempted compared with the information in the table;
execute the unauthorized action in the first region of the memory for the non-privileged application; and
allow the non-privileged application to continue execution.

2. The system according to claim 1, wherein the security software is configured to obtain the characteristics of the unauthorized action from the generated exception.

3. The system according to claim 2, wherein the obtained characteristics further comprise one or more of: an address of the memory targeted by the unauthorized action, an identification of the non-privileged application attempting the unauthorized action in the memory, an operator code of the unauthorized action, or registers of the unauthorized action.

4. The system according to claim 2, wherein the security software is configured to compare the obtained characteristics of the unauthorized action to the information representative of actions that can be performed in the first region of the memory.

5. The system according to claim 4, wherein the information is stored in a second memory accessible only by the security software.

6. The system according to claim 1, wherein the hardware memory protection unit is further configured to define the first and second regions in the memory.

7. A method for protecting a memory of a system, the method comprising:
assigning, by a hardware memory protection unit, a first protection level to a first region of the memory, wherein the first protection level is privileged;
assigning, by the hardware memory protection unit, a second protection level to a second region of the memory, wherein the second protection level is non-privileged;
allowing, by the hardware memory protection unit, a privileged application access to the first and second regions of the memory, and a non-privileged application access to the second region of the memory; and generating, by the hardware memory protection unit, an exception in response to an attempt by the non-privileged application to perform an unauthorized action in the first region of the memory;

managing, by a memory management unit, the memory;

storing, by a table accessible only by security software in the system, information representative of actions that can be performed in the first region of the memory by the security software but not by the non-privileged application, the security software being separate software from the applications;

determining, by the security software, in response to the exception, whether the security software is authorized to perform the unauthorized action in the first region of the memory based on at least read versus write characteristics of the unauthorized action being attempted compared with the information in the table;

executing, by the security software, the unauthorized action in the first region of the memory for the non-privileged application; and allowing, by the security software, the non-privileged application to continue execution.

8. The method according to claim 7, further comprising decrypting, by the security software, the exception to obtain the characteristics of the unauthorized action.

9. The method according to claim 7, further comprising performing, by the security software, the unauthorized action.

10. The method according to claim 9, wherein the non-privileged application continues its execution after the security software performs the unauthorized action.

11. The method according to claim 7, wherein the determining further comprises:

obtaining, by the security software, the characteristics of the unauthorized action from the generated exception; and comparing, by the security software, the obtained characteristics of the unauthorized action to the information representative of actions that can be performed in the first region of the memory.

12. A system comprising:

a first non-transitory memory storage comprising privileged memory and non-privileged memory;

a hardware memory protection unit in communication with the first non-transitory memory storage, wherein the hardware memory protection unit is configured to:

assign a privileged protection level to the privileged memory;

assign a non-privileged protection level to the non-privileged memory;

allow a privileged application access to the privileged memory and the non-privileged memory, and a non-privileged application access to the non-privileged memory; and generate an exception in response to an attempt by the non-privileged application to perform an unauthorized action in the privileged memory in the first non-transitory memory storage;

a table accessible only by security software in the system, wherein the table comprises information representative of actions that can be performed in the privileged memory by the security software but not by the non-privileged application, and wherein the security software is separate software from the applications; and a second non-transitory memory storage comprising the security software in communication with the hardware memory protection unit, wherein the security software is configured to determine, in response to the exception, whether the security software is authorized to perform the unauthorized action in the privileged memory based on at least read versus write characteristics of the unauthorized action being attempted compared with the information in the table, and to:

in response to determining the security software is authorized to perform the unauthorized action, execute the unauthorized action in the privileged memory for the non-privileged application and allow the non-privileged application to continue execution; or in response to determining the security software is not authorized to perform the unauthorized action in the privileged the memory, prohibit performance of the unauthorized action; and a memory management unit configured to manage the first and second non-transitory memory storages.

13. The system according to claim 12, wherein the first and second non-transitory memory storages are a same memory storage.

14. The system according to claim 12, wherein the security software configured to determine comprises the security software configured to:

obtain the characteristics of the unauthorized action from the generated exception.

15. The system according to claim 14, wherein the obtained characteristics further comprise one or more of: an address of a memory location targeted by the unauthorized action, an identification of the non-privileged application attempting the unauthorized action, an operator code of the unauthorized action, or registers of the unauthorized action.

16. The system according to claim 12, wherein the hardware memory protection unit is further configured to:

define regions for the privileged memory and the non-privileged memory in the first non-transitory memory storage.

17. The system according to claim 14, wherein the security software configured to determine comprises the security software configured to compare the obtained characteristics of the unauthorized action to the information representative of actions that can be performed in the privileged memory in the first non-transitory memory storage.

18. The system according to claim 17, wherein the information is stored in another memory storage accessible only by the security software.

19. The method according to claim 7, further comprising defining, by the hardware memory protection unit, is further configured to define the first and second regions in the memory.

\* \* \* \* \*